United States Patent Office 3,142,712
Patented July 28, 1964

3,142,712
METHOD OF MANUFACTURE OF CONJUGATE DIOLEFINS FROM METADIOXANES
André Marie Valet, Fontenay Aux Roses, and Joseph Edouard Weisang and Philippe Jean Paul Maillot, Le Havre, France, assignors to Société Anonyme dite: Compagnie Francaise de Raffinage, Paris, France, a corporation of France
No Drawing. Filed Mar. 23, 1961, Ser. No. 97,750
Claims priority, application France Mar. 31, 1960
12 Claims. (Cl. 260—681)

The present invention relates to a method of manufacture of diolefins with double conjugate bonds from metadioxanes.

It is known that olefins can react with aldehydes, especially with formaldehyde, in the presence of mineral acid catalysts, such as sulphuric acid, hydrochloric acid, phosphoric acid, to give metadioxanes, in other words the acetals of 1-3 diols.

In this way, 4 methyl 1-3 dioxane is obtained as a condensation product from propylene and formaldehyde, following the reaction:

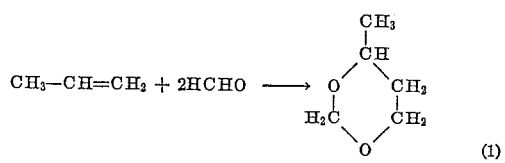
(1)

The product 4-4' dimethyl 1-3 dioxane is obtained from isobutylene in accordance with the reaction:

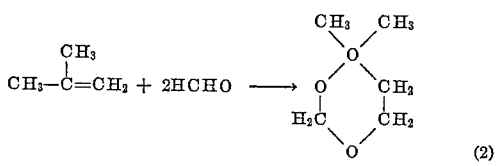
(2)

It is also known that, under determined operating conditions and in the presence of catalysts, the metadioxanes can decompose so as to give a molecule of diolefin with double conjugate bonds and to regenerate a molecule of aldehyde. For example, the 4-4' dimethyl-metadioxane gives the following reaction with the formation of isoprene:

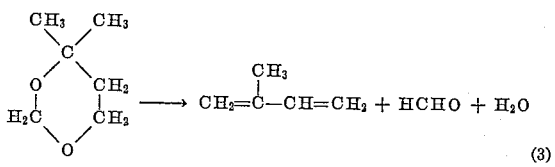
(3)

During this operation, it is necessary to prevent the dioxane from decomposing to olefin and two molecules of formaldehyde, that is to say from reverting to the products from which it was prepared, by the reversed reaction of its formation:

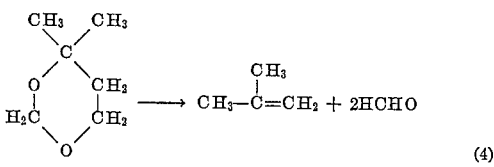
(4)

The conversion of metadioxanes with a view to the production of diolefins has been carried out up to the present time in the presence of acid catalysts, for example phosphoric acid. To this end, impregnated catalysts are employed; these catalysts are most frequently constituted by active carbon impregnated with phosphoric acid and/or acid salts of phosphoric acid and in some cases organic phosphates.

The defect of all these catalysts is that they do not completely prevent the existence of the degradation reaction of the metadioxanes to olefins, and in particular they become rapidly covered with resins or tars, thereby losing their activity. The life of these catalysts is in practice only a few weeks, and this necessitates costly stoppages of manufacture in order to change the catalyst.

The present invention has for its object improvements in the above-mentioned process of conversion of metadioxanes to diolefins with double conjugate bonds. These improvements consist in the utilization of catalysts with a base of combinations of phosphoric acid and boric acid.

It is known that boron phosphate, having the formula $BPO_4$ is the result of the reaction of orthophosphoric acid on boric acid.

Boron phosphate has already been recommended as a catalyst in hydration or de-hydration reactions, for example for the hydration of olefins to the corresponding alcohols, or again for the de-hydration of alcohols, diols, etc., to the corresponding olefins or diolefins. These known reactions are solely accompanied by the addition or elimination of water. On the other hand, in the reactions to which the present invention is applied, the raw materials are not olefins, alcohols or diols, but are metadioxanes, and on the other hand they eliminate not only water but also a molecule of formaldehyde, which is characteristic of this type of reaction. Finally, as has already been stated above, they may comprise two reactions: either the desired formation of diolefins, for example isoprene (Reaction 3), or the undesired formation of olefins, for example isobutylene (Reaction 4). Such a possibility is however absent from the known processes referred to above.

The discovery made by the applicants, that boron phosphate is a remarkable catalyst for the decomposition of metadioxanes to diolefins with double conjugate bonds could therefore not be foreseen, firstly having regard to the complex nature of this type of reaction which—without of course making any assumptions as to their real mechanism—terminates in a de-cyclysation and the reconstitution of a molecule of aldehyde accompanied by a molecule of water. But it was particularly impossible to foresee a priori that boron phosphate would exercise a preferable orientation of the conversion towards the formation of dienes, minimizing almost entirely the degradation of the metadioxanes towards the mono-olefins from which they have been prepared.

Boron phosphate is prepared by causing stoichiometric quantities of phosphoric acid to react with boric acid.

Boron phosphate is a solid substance and can be employed in its existing state, in pieces, in a catalytic reaction tube, but it is also possible, if this is preferred, to arrange it on an inert support, for example silica gel, or any other inert support having a non-basic nature.

If, in course of time, the activity of the boron phosphate catalyst becomes reduced as a result of a progressive deposit of carbon, its initial activity can quite easily be restored by burning the deposit of coke formed in a current of air between 500° and 700° C., irrespective on whether the boron phosphate is deposited on a noncombustible support or is used in its actual state.

On the other hand, it is a stable catalyst resistant to the action of steam. There cannot be observed either hydrolysis or the formation of boric or phosphoric compounds or ethers.

Boron phosphate is active between 200° and 350° C., and preferably between 225 and 325° C. The reaction can be carried out either at atmospheric pressure or under a slight pressure.

EXAMPLE 1

Boron phosphate is prepared by causing the reaction at ordinary temperatures of equi-molecular quantities of concentrated orthophosphoric acid and finely-powdered crystallised boric acid.

Over 200 grams of fragments of boron phosphate, previously dried and baked at a suitable temperature, there is passed 200 grams per hour for 4 hours at 250° C., of pure 4-4′ dimethyl metadioxane, boiling at 134.5° C. under atmospheric pressure.

At the outlet of the catalyst tube, there is collected 17.5 grams per hour of isoprene and a fraction containing, in addition to about 168 grams of unconverted dioxane, a mixture of water and concentrated formol. There are found practically no heavy products and no isobutylene.

EXAMPLE 2

There is introduced into a catalyst tube 200 grams of boron phosphate prepared in the manner described above, and this is heated to 275° C. There is then passed over the catalyst, on the one hand 200 grams per hour of 4-4′ dimethyl 1-3 dioxane in the crude state (obtained by the action of formol on isobutylene), containing about 6% of water, 8% of tertiary butyl alcohol as impurities, and on the other hand 100 grams of water per hour, the whole being previously vaporized and brought to the vicinity of the reaction temperature.

The effluent products are condensed. After separation, there are collected per hour: 22.5 grams of isoprene, 10 grams of isobutylene, and 130 grams of pure dioxane, free from alcohol is recovered. There remains an aqueous fraction containing the formol produced by the reaction, and small quantities of soluble glycols.

There is found no appreciable trace of tars or resins, either in the residual water or in the recovered dioxane. It will furthermore be noted that the isobutylene collected is obtained exclusively from the de-hydration of the tertiary butanol present in the charge, which means that the degradation of the dioxane to isobutene has been completely prevented.

EXAMPLE 3

Over a boron phosphate catalyst prepared as described above, there is passed 4-4′-5 trimethyl-metadioxane (boiling point 151° to 154° C.) at the rate of 150 grams per hour for 200 grams of catalyst, at atmospheric pressure and a temperature of 280° C.

There are collected at the outlet about 25 grams per hour of 2-4 dimethyl 1-3 butadiene and there are also recovered 105 grams per hour of unconverted trimethyl-metadioxane, with the water and formol formed.

In the above examples, the theoretical boron phosphate $BPO_4$ was prepared by causing the reaction of quantities of phosphoric acid and boric acid in stoichiometric proportions, that is to say with a molar ratio P/B=1, or with a slight excess of one or the other of the constituents. The applicants' researches have however revealed that combinations or catalyst preparations obtained by reaction of phosphoric and boric acids in proportions other than the stoichiometric proportions have definitely improved catalytic properties. The combinations in which the molar ratio P/B is greater than 1 and preferably in the vicinity of 1.5 to 1.6 have exceptional advantages.

The applicants' researches have in fact brought out quite clearly and in an entirely unexpected manner, that these new combinations or preparations in which the molar ratio P/B is greater than 1, have a higher activity than the others under the same reaction conditions and, in particular, conditions of temperature. Furthermore, although these new combinations are prepared with an excess of phosphoric acid with respect to the boric acid, they have no free acidity.

In order to obtain a given conversion per hour of metadioxanes to diolefins, it is possible with the new combinations to operate at lower temperatures than with catalysts having a basis of boron phosphate with the ratio P/B=1.

As has been indicated above, these catalysts with a basis of boron phosphate have a selective catalytic activity under the usual conditions of reaction temperature, for example between 225° and 275° C., which means that in this range, the stray conversion of the dioxane to olefins and formol is kept at a low value as compared with the conversion to diolefins. If however the temperature at which the reaction is carried out is increased, this selectivity has a tendency to diminish, especially when 300° C. is reached and still more so at 325° C. and over.

Now, the applicants have observed that when the ratio P/B is greater than 1, the catalyst has not only a selectivity at least as good as when P/B is smaller than or equal to 1, but that it possesses the additional advantage of maintaining this property much better than the preceding combinations when the reaction temperature is increased.

In short, by virtue of their improved qualities of selectivity and activity, these new phospho-boric catalysts enable the decomposition of dioxanes to be effected at lower temperatures and under more favorable conditions, so as to obtain at the same time a better yield of dienes and a less rapid ageing of the catalyst.

The advantages of the new catalysts are clearly brought out by the comparison shown in Table 1 given below, of the catalytic properties of three series of phospho-boric combinations prepared in the same manner, but in which the molar ratio P/B has three different values: 0.5–1 and 1.55.

The tests were carried out for each series at three temperatures, namely 200°, 250° and 300° C., the other conditions being identical in all the tests.

The reactor was supplied with a mixture of dimethyl 4-4′ dioxane 1-3 (obtained by condensation of isobutylene on formol) and water in the proportion by weight of dioxane/water=0.5. The activity results are expressed as a molar percentage of conversion of dioxane to isoprene per pass; the selectivity is expressed by the molar ratio of isobutylene/isoprene. It is shown very clearly from these data that for the catalyst P/B=1.55, the activity is always greater than that of the two other catalysts, and that its selectivity varies very little when the temperature is increased to 300° C., whereas the catalysts with P/B=0.5 and P/B=1 lose their selectivity under these conditions.

Table I

| Catalysts. Activity and selectivity, ° C. | P/B mol.=0.5 | | P/B mol.=1 | | P/B mol.=1.55 | |
|---|---|---|---|---|---|---|
| | Isoprene / dioxane | Isobutene / isoprene | Isoprene / dioxane | Isobutene / isoprene | Isoprene / dioxane | Isobutene / isoprene |
| | Percent mol. | Percent mol. | Percent mol. | Percent mol. | Percent mol. | Percent mol. |
| 200 | 48 | 3 | 44 | 3.5 | 55 | 3 |
| 250 | 38 | 10 | 50 | 12 | 61 | 5 |
| 300 | 33 | 44 | 52 | 40 | 65 | 9 |

Supply: A mixture of 1 part 4-4′-dimethyl 1-3 dioxane with 2 parts of water by weight.

The preparation of catalysts in which the molar ratio P/B is greater than 1 is illustrated below, but not in any limitative sense, by the method of operation employed for the catalyst P/B=1.55:

40 grams of crystallized boric acid are dissolved in 150 ml. of boiling water. While maintaining constant stirring, there are added 68 ml. (116 grams) of orthophosphoric acid at 85% weight. After addition of the whole of the acid, the water is first evaporated in a water-bath, and then by moderate heating in a sand-bath without exceeding the temperature of 150° C.

When the mass has reached the dry state, it is finely ground and the product is extruded in the form of small rods by means of the addition of the quantity of water just sufficient to produce a paste of suitable consistency for extrusion.

The small sticks are dried in an oven at 120° C. and are then calibrated in small cylinders of 3 mm. in diameter and 5 mm. in length. They are then baked in a muffle furnace up to a temperature of 500–800° C., and preferably between 600 and 650° C. until their weight remains constant. Analysis has shown that with catalysts prepared in the above manner, the ratio P/B is constantly equal to 1.5.

Instead of forming the catalyst in extruded rods, it may also be made into pellets from the dry powder, by means of the addition of a small quantity of graphite, of the order of 1%.

It should be noted that the baking operation is applied irrespective of the P/B ratio.

Without departing from the scope of the invention, it is also possible to deposit the phospho-boric catalysts on inert supports, such as silica for example. Fragments of silica gel are impregnated with a hot aqueous solution of phosphoric and boric acids; the impregnated mass is dried in an oven and then calcined between 500° and 800° C., and preferably between 600° and 650° C.

Furthermore, the catalyst in powder form, or deposited on a powdered support, can be utilized in the form of a fluid or moving bed.

It should be emphasized that the preferred phospho-boric combination of the invention, that is to say in which the P/B ratio is comprised substantially between 1.5 and 1.6, and which, after baking of the mass, is a substance having no free acidity, constitutes a new combination which is different from the theoretical boron phosphate, $BPO_4$.

The regeneration of these new catalysts can be effected in the same manner as that indicated above for boron phosphate itself. After burning off the deposit of coke between 500° and 700° C. and preferably between 500° and 550° C., the initial activity of the catalyst is completely restored. The regeneration can be repeated as required. None of the catalysts tested has shown any reduction in its activity after 10 regenerations. In consequence, this property is such as to permit the use of the new catalysts in moving bed or fluid bed systems with continuous regeneration and without fear of coking, at high temperatures of the order of 300° C., at which they have their maximum activity while maintaining a good selectivity, as has been demonstrated above.

As in the case of boron phosphate, it is advantageous to pass a mixture of metadioxane and steam over the catalyst. The dilution with steam has the effect of increasing the conversion per pass of metadioxane to isoprene and improves the overall yield, while at the same time it protects the activity of the catalyst. In the preferred form of the invention, the ratio metadioxane/water by weight will be less than or equal to 1, and preferably of the order of 0.5.

The following Table II shows the advantage obtained as a function of the quantity of water. The activity of the catalyst is entirely stable in respect of time: after having measured the conversion of 60.2%, the test was continued for a further 4 hours. After this period, the conversion was 60.1%.

Without departing from the scope of the invention, it is also possible to replace a part of the steam by an inert gas.

*Table II*

Phospho-boric catalyst P/B (mol.)=1.55
Temperature: 200° C.
Supply: Dimethyl 4-4' metadioxane, water, in varying proportions.
Total rate of feed (dioxane+water)=8 mols/hour/litre.

| Ratio by weight dioxane/water | Conversion per pass (mol.) per 100 mols. of dioxane supplied | | Overall yield (mols) per 100 mols. of dioxane converted | |
|---|---|---|---|---|
| | Isoprene | Formol | Isoprene | Formol |
| 2 | 24.9 | 32.4 | 67.3 | 76.0 |
| 1 | 47.5 | 48.4 | 79.5 | 84.2 |
| 0.5 | 60.2 | 60.2 | 82.6 | 82.3 |

Catalysts with a base of $BPO_4$ are especially active in the manufacture of isoprene from 4-4' dimethyl-metadioxane and/or from 4-5 dimethyl-metadioxane, but they are also suitable, irrespective of the ratio P/B, for the preparation of the other diolefins with double conjugate bonds from the corresponding alkyl-metadioxanes, for example: butadiene 1–3 from 4-methyl 1-3 dioxane; dimethyl 2-3 butadiene 1-3 from 4-4'-5 trimethyl-metadioxane (which can be prepared by acting on trimethylethylene with formaldehyde), and so on.

What we claim is:
1. In a method for manufacturing diolefins having double conjugate bonds from alkyl metadioxanes by catalytic scission of said dioxanes forming said diolefins and formaldehyde, the steps which comprise passing said alkyl metadioxanes at elevated temperature over a catalyst for said scission reaction in a reaction zone, maintaining said elevated temperature throughout said reaction zone effecting said scission reaction and splitting of said dioxanes to yield said diolefin and said formaldehyde, said catalyst consisting essentially of the dried and solid reaction product of phosphoric acid and boric acid reacted in a non-stoichiometric molar ratio of phosphorus to boron of about 1.5 to 1.6.

2. The method as recited in claim 1 in which said dried and solid catalyst material is baked prior to said scission reaction and at a temperature within the range of about 500° to 800° C.

3. The method as recited in claim 1 in which said dried and solid catalyst material is baked prior to said scission reaction and at a temperature within the range of about 550° to 650° C.

4. The method as recited in claim 1 in which said dried and solid catalyst is present in said reaction zone as deposited on an inert solid support.

5. The method as recited in claim 1 in which said dried and solid catalyst is present in said reaction zone as comprising a fluid and moving catalyst bed.

6. In a method for manufacturing diolefins having double conjugate bonds from alkyl metadioxanes by catalytic scission of said dioxanes forming said diolefins and formaldehyde, the steps which comprise passing said alkyl metadioxanes in vaporous state and admixed with steam at elevated temperature over a catalyst for said scission reaction in a reaction zone, maintaining said elevated temperature throughout said reaction zone effecting said scission reaction and splitting of said dioxanes to yield said diolefin and said formaldehyde, said catalyst consisting essentially of the dried and solid reaction product of phosphoric acid and boric acid reacted in a non-stoichiometric molar ratio of phosphorus to boron within the range of about 1.5 to 1.6.

7. The method as recited in claim 6 in which said mixture of alkyl metadioxane and steam is constituted by said materials present in a weight ratio of dioxane to water less than 1.

8. The method as recited in claim 6 in which said mixture of alkyl metadioxane and steam is constituted by said materials present in a weight ratio of dioxane to water of approximately 0.5.

9. In a method for manufacturing isoprene from 4-4'-dimethyl-1-3-dioxane by catalytic scission of said dioxanes forming said isoprene and formaldehyde, the steps which comprise passing said 4-4'-dimethyl-1-3-dioxane at elevated temperature over a catalyst for said scission reaction in a reaction zone, maintaining said elevated temperature throughout said reaction zone effecting said scission reaction and splitting of said dioxanes to yield said isoprene and said formaldehyde, said catalyst consisting essentially of the dried and solid reaction product of phosphoric acid and boric acid reacted in a molar ratio of phosphorus to boron within a range of about 1.5 to 1.6.

10. The method as recited in claim 9 in which said dried and solid catalyst material is baked prior to said scission reaction and at a temperature within the range of about 550° to 650° C.

11. The method as recited in claim 9 in which said dioxane is admixed with steam in a proportion ratio by weight of dioxane to water of the order of 0.5.

12. In a method for manufacturing isoprene from 4-5-dimethyl-1-3-dioxane by catalytic scission of said dioxane forming said isoprene and formaldehyde, the steps which comprise passing said 4-5-dimethyl-1-3-dioxane admixed with steam at an elevated temperature over a catalyst for said scission reaction in a reaction zone, the proportion ratio by weight of said dioxane to water in said steam admixture being of the order of 0.5, maintaining said elevated temperature throughout said reaction zone and within the range of about 550°–650° C. effecting scission reaction and splitting said dioxane to yield said isoprene and said formaldehyde, said catalyst consisting essentially of the dried and solid reaction product of phosphoric and boric acid reacted in a molar ratio of phosphorus to boron within a range of about 1.5 to 1.6.

References Cited in the file of this patent

UNITED STATES PATENTS

| | | |
|---|---|---|
| 2,350,485 | Arundale et al. | June 6, 1944 |
| 2,997,509 | Wirth | Aug. 22, 1961 |